Figure 1:
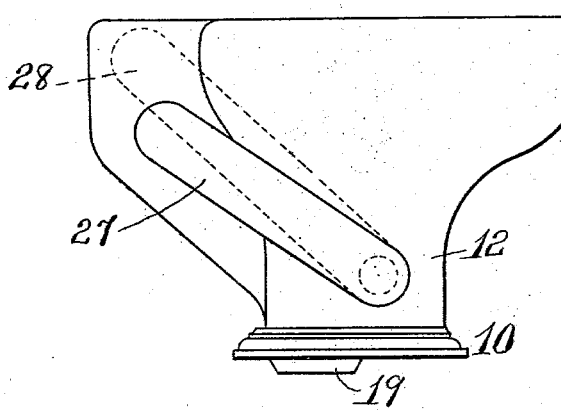

No. 740,662. PATENTED OCT. 6, 1903.
G. W. KNAPP & C. H. ROLLINS.
WATER CLOSET.
APPLICATION FILED NOV. 23, 1900.

NO MODEL. 3 SHEETS—SHEET 1.

WITNESSES. INVENTORS

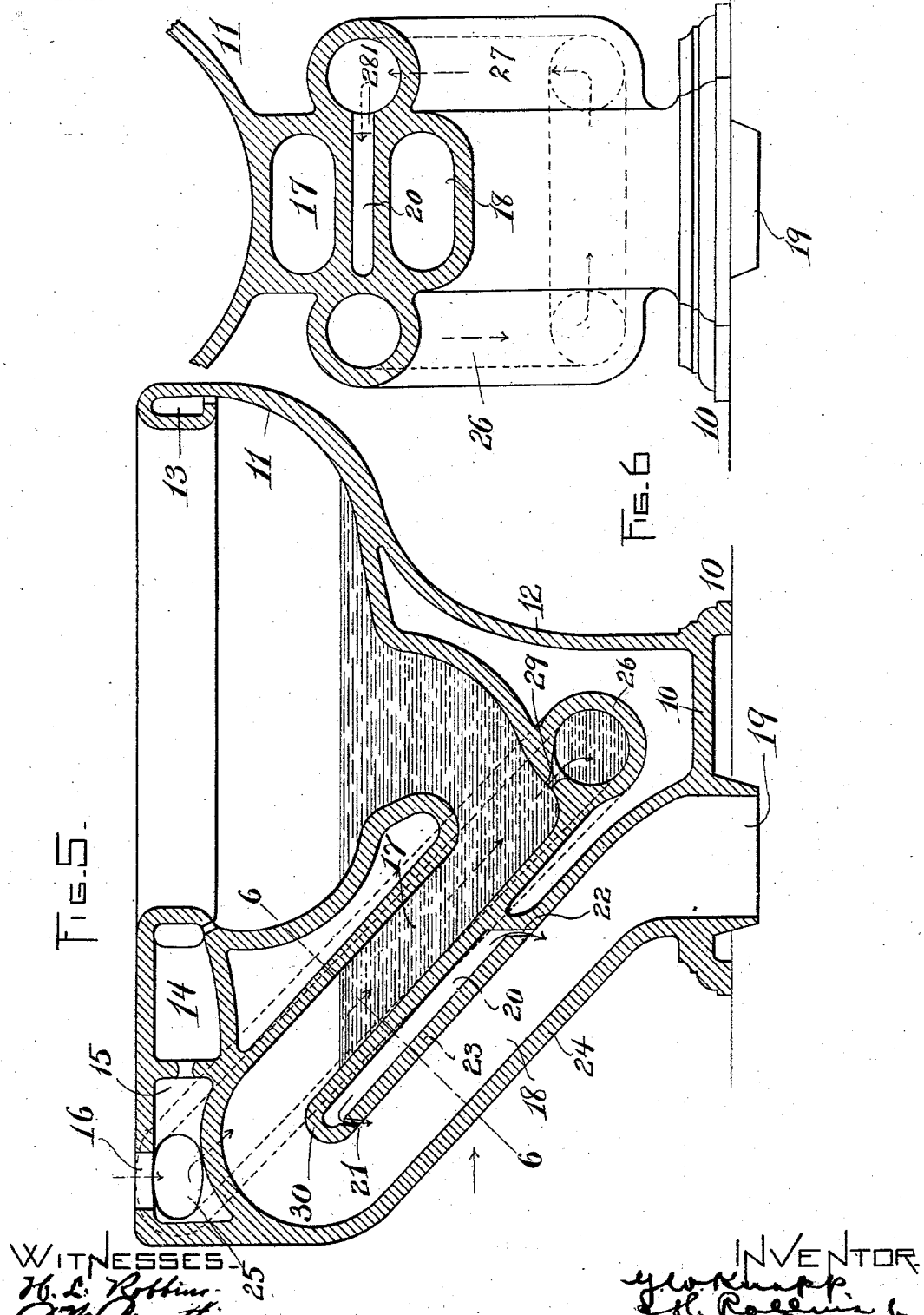

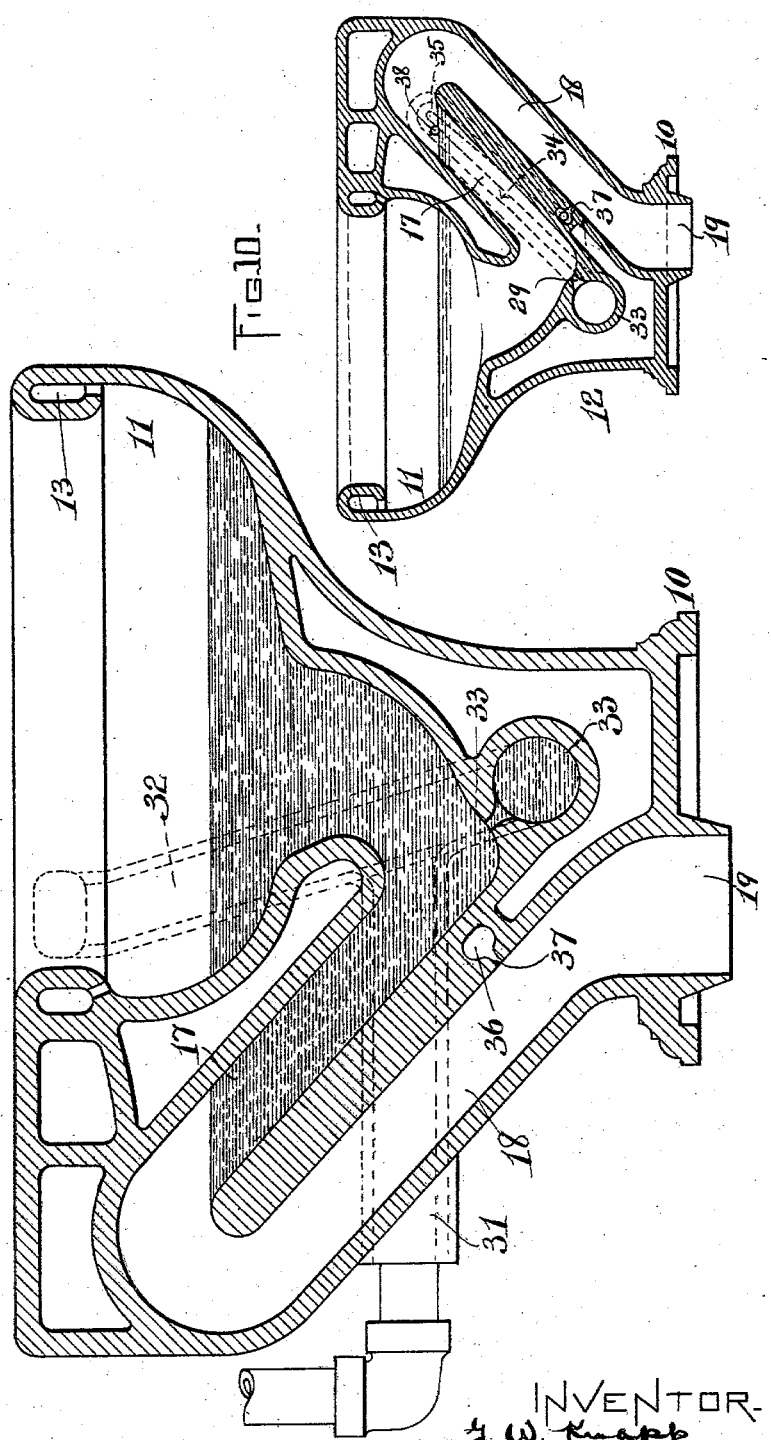

No. 740,662. Patented October 6, 1903.

UNITED STATES PATENT OFFICE.

GEORGE W. KNAPP, OF STONEHAM, AND CHARLES H. ROLLINS, OF WATERTOWN, MASSACHUSETTS.

WATER-CLOSET.

SPECIFICATION forming part of Letters Patent No. 740,662, dated October 6, 1903.

Application filed November 23, 1900. Serial No. 37,425. (No model.)

*To all whom it may concern:*

Be it known that we, GEORGE W. KNAPP, of Stoneham, and CHARLES H. ROLLINS, of Watertown, in the county of Middlesex and State of Massachusetts, have invented certain new and useful Improvements in Water-Closets, of which the following is a specification.

This invention has relation to water-closets, urinals, slop-hoppers, &c., in which water is maintained at a substantially fixed level and is discharged by siphonic action upon additional water entering the bowl.

Up to the present time a variety of devices or apparatus have been made or proposed for accomplishing the siphonic discharge of the water from the bowl. The earliest siphonic water-closets were each provided with a weir or false trap below the bowl-trap and means for withdrawing the air confined above the weir. The rarefaction of the air for effecting the siphonic action was caused in a variety of ways, although it was proposed in some cases to secure such rarefaction by the flow of water from the bowl through the confined air, so as to carry a portion of it through the weir, and thus reduce the pressure of the confined atmosphere below the normal atmospheric pressure in the bowl. Closets provided with weirs were clumsy and cumbersome, and there were many disadvantages incident to their employment—to wit, the sluggishness of the siphonic action, the liability of the outlet-limbs and the weir to become clogged, and the difficulty of cleaning the closet. Still later it was proposed to secure the siphonic action by forming the discharge-limb of the siphon with an annular chamber surrounding a nozzle and introducing water from the tank into the annular chamber, so that the suction of the current of water flowing in a cylindrical stream past the nozzle would cause the formation of a partial vacuum in the discharge-limb of the siphon. Closets of this type were unsanitary and unsuccessful, since the annular chamber was formed necessarily separately from the closet and rendered it difficult for a plumber to properly set the latter. Moreover, the induction-nozzle in the annular chamber offered a serious obstruction to the passage of the contents of the bowl, and the connections between the chamber and the flushing-tank provided a ready escape for the sewer-gas from the sewer-pipe into the house. Subsequently, however, it was proposed to dispense with the weir and the annular chamber and to provide the discharging-limb of the siphon with a deflecting-surface so arranged with relation to the dam that water from the bowl flowing over the dam would be deflected across the discharge-limb of the siphon in a film or spray, thereby confining the air above it and permitting the rarefaction of said air by the flow of water from the bowl to such an extent as to cause siphonic action to occur. In such closets in order to assist in preventing backflow of air from the pipe through the film of the water it is found necessary to carry the discharge-limb laterally or forwardly under the bowl, so as to dam up the outflowing water therein.

Water-closets embodying the siphon-limb having the deflector and the laterally-extending portion have gone into wide and general use in spite of their disadvantageous features. The deflector was provided either by placing a projection upon the inner wall of the discharging-limb or by bending the course of the limb inward and then outward, so that the angle formed thereby would serve to deflect the water; but in such closets it has been found that obstructions are liable to lodge in the laterally-projecting portion of the limb and that by reason of the turns, bends, or projections formed in the limb it has been difficult to clear the closet where obstructions occur therein or to clean the same.

The object of the present invention is to provide a closet or other similar device with means whereby the contents of the bowl may be withdrawn by siphonic action without the necessity of providing deflecting-surfaces in the discharging-limb of the siphon, whereby both limbs of the siphon may be practically straight to provide a non-tortuous passage for the water and other matter in the bowl.

According to the present invention it is our purpose to secure the formation of a film of water across the discharging-limb of the siphon by water from the tank and not from the bowl, since we are thereby enabled to secure more rapid siphonic action than heretofore. Accordingly we provide a closet having an inverted-U-shaped siphon, the limbs of which are substantially straight and are preferably, though not necessarily, inclined from the vertical, so as to bring the mouth of the discharging-limb substantially under the bowl. As illustrated upon the drawings, the upper wall of the discharging-limb is formed with one or more narrow slots or apertures which communicate with a duct leading from an inlet connected with the flushing-tank, so that when the bowl is to be flushed the water will flow through the duct and be discharged in one or more films or sprays across the discharging-limb to form a lower seal below the intake and not only confine in the limb the air, but also prevent the backflow of air therethrough. The duct which supplies the water for the formation of the film or films across the discharging-limb is connected with the inlet by which water is supplied to the flushing-rim, and consequently when the valve is opened for the purpose of flushing the bowl water rushes into the duct and forms one or more films across the discharging-limb of the siphon, whereby when the level of water rises in the bowl, and thereby flows over the dam, it carries with it the air which is confined above the film and so rarefies the confined air and reduces the atmospheric pressure in the part of the discharging-limb below the normal pressure of air in the bowl that siphonic action immediately takes place and the contents of the bowl are withdrawn. Where the siphon is provided with a jet discharging into the inlet-limb of the siphon, the duct through which the water is supplied to form the film may communicate directly with the jet-supplying duct, as illustrated upon the drawings. It is preferred that the limbs of the siphon should be substantially elliptical in cross-section, as such construction provides more easily for the formation of the film or lower seal across the discharging-limb of the siphon than where the limbs are round in cross-section.

Upon the accompanying drawings we have illustrated different forms of closet in which the invention may be embodied; but it will be understood that the invention is not limited thereto, but may likewise be embodied in various other forms, which will readily suggest themselves to those skilled in the art to which this invention relates.

Figure 3:
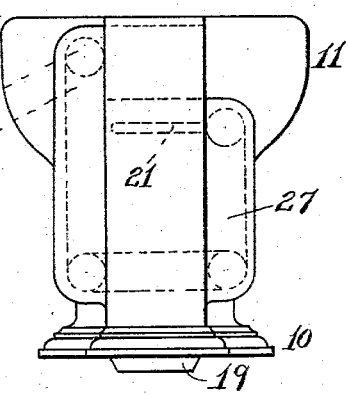
Figure 2:
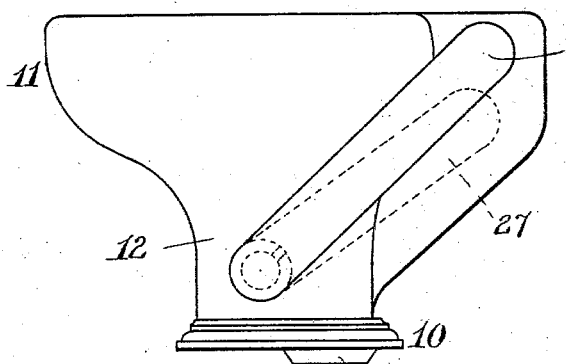
Figure 4:
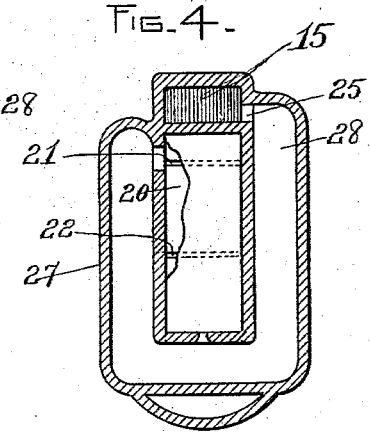
Figure 7:
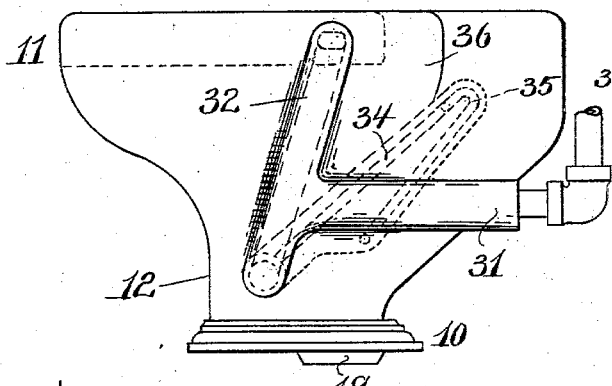
Figure 8:
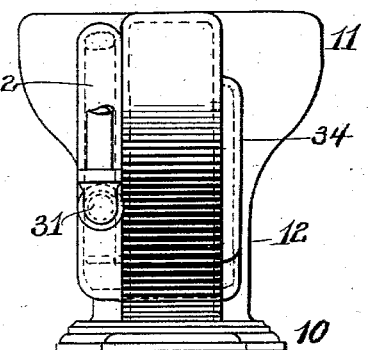

On the said drawings, Figure 1 represents an elevation from one side of a closet embodying the invention. Fig. 2 represents an elevation of the other side of the same. Fig. 3 represents a rear elevation. Fig. 4 represents a section through the closet to show the course of the water as supplied to the film-forming ducts. Fig. 5 represents an enlarged longitudinal section through the closet. Fig. 6 represents a section on the line 6 6 of Fig. 5 looking in the direction of the arrow. Fig. 7 represents in side elevation another embodiment of the invention. Fig. 8 represents a rear elevation of the same. Fig. 9 represents an enlarged longitudinal section therethrough. Fig. 10 represents a reduced section of the same.

Referring to the drawings, there is indicated in Figs. 1 to 6, inclusive, a siphon-jet closet, many of the features of which are well known. Said closet comprises the base 10, which is adapted to rest upon the floor, the bowl 11, and the strut or brace 12, by which the bowl is supported and which conceals the outlet of the bowl. The bowl is provided with the usual flushing-rim 13, communicating with the duct 14, the latter opening from the retarding-chamber 15, to which the water is introduced through the inlet 16. The bowl may be of any desired shape, and its outlet discharges into the siphon, which consists of a U-shaped pipe having the inlet-limb 17 and the outlet-limb 18. In the form shown upon the drawings the limbs are inclined rearwardly, so that the outlet of the discharging-limb 18 is located substantially under the bowl, said outlet being indicated at 19 and passing through the base 10. The two limbs of the U-shaped pipe are substantially parallel, and between them there is formed a chamber 20, with which communicate slots or apertures 21 22, formed in the upper wall 23 of the discharging-limb of the pipe. In cross-section the limbs 17 and 18 are flattened or substantially elliptical, as shown in Fig. 6, the shape of the chamber 20 being clearly illustrated in the last-mentioned figure.

It will be observed that the slot 21 is located at the upper end of the chamber 20 and the slot 22 is located at the lower end, said slots being arranged substantially vertical, so that water is discharged therefrom to form a film or spray and will splash against the lower wall 24 of the discharging-limb.

Formed in the side of the inlet-retarding chamber is an aperture 25, leading into a duct or pipe 28, which extends downward and forward and then in front of the lower end of the inlet-limb of the siphon. It then bends upward and rearward, the upward and rearward limb being indicated for convenience as 27. The upper end of the duct or limb 27 communicates with the upper end of the chamber 20 through an aperture 281, as shown in Fig. 6, in alinement with the inlet-limb of the siphon. A jet-aperture 29 is formed between the substantially horizontal portions of the jet-supplying duct 26 and the end of the limb 17, although it will be understood that we may omit the jet, if desired. The closet may be built of pottery in the ordinary way, and, if desired, the form and location of the ducts may be changed in accordance with particular requirements.

The operation of the closet is as follows: Assuming that water be standing in the bowl to the height indicated in Fig. 5, upon opening the valve in the flushing-tank the following results take place: The water rushes violently from the tank into the chamber 15 and taking the course of least resistance passes outward through the aperture 25 into the duct 26, so that by the time one body of water reaches the flushing-rim 13 another body of water has filled the chamber 20 and thin films of water are discharged across the discharging-limb 18 to form a lower seal below the intake. As the accession from the flushing-rim of water causes the level of water in the bowl to rise and to flow over the dam, which is indicated at 30, a sufficient portion of the air which is confined above the films will be carried with the outflowing water down past them to rarefy the confined air to a pressure below the normal pressure of the atmosphere, whereupon siphonic action will take place and the contents of the bowl will be immediately discharged. The formation of the films of water across the discharging-limb of the siphon prevents the backflow of air, and consequently the rarefaction of the confined air above the film quickly takes place to such an extent that the siphonic action occurs almost immediately upon the flowing of water into the bowl and the raising of the level thereof. When the supply of water from the flushing-tank is cut off and the siphon is broken by the level of the water in the bowl descending to the top of the inlet to limb 17, sufficient water flows from the retarding-chamber to raise the level of the water in the bowl to the plane shown in Fig. 5, and the slot 21 or its equivalent is necessary to prevent the siphoning of the water from the bowl, since it breaks the siphon at the proper time. Where there is but one aperture between the duct and the siphon, water would continue to flow through the small duct until all of the water from the bowl would be siphoned. The chamber 20 and the duct 28 in Figs. 5 and 6 form a trap, and as said duct 28 communicates with the duct 26 it is apparent that if the chamber 20 were once filled and water started to flow out it would siphon water from the bowl and from the two ducts until the level of the aperture 22 was reached; but by providing the opening or slot 21 it is apparent that this siphonage is broken as soon as the level of the water in the bowl and in the two ducts and also in the chamber 20 drops below the slot 21, as air is then admitted through the slot 21. It is for this reason that in Fig. 10 the aperture 38 is provided, although said aperture does not discharge water across the downgoing leg or limb 18. While we prefer to have the aperture 21 narrow and elongated to form a film or spray across the discharging-limb of the siphon, yet said aperture may be round, the aperture 22 being depended upon to cause the formation of the film or spray. One advantage of employing two films is that the water from the upper film assists or partially causes by induction the siphonic discharge of the contents of the closet.

It is unnecessary to describe the action of the jet 29, as it is well known to those skilled in the art; but we may here state that the static pressure of the column of water leading from the tank is such as to cause the water to pass quickly through the ducts 26 and 27 to the film-forming chamber 20, so that the films are formed not by the water from the bowl, but directly by the water from the flushing-tank.

It is evident that our closet may be constructed in a variety of ways. For instance, in Figs. 7 to 9, inclusive, a closet is illustrated in which the inlet-duct for the flushing-water is indicated at 31 and is arranged below the flushing-rim. In this case the said inlet communicates by a duct 32 with the flushing-rim 13, said duct extending upward, as clearly shown upon the drawings. Communicating with the inlet-duct is the duct 33, which extends downwardly and then laterally under the bowl, communicating with another duct 34, which extends upwardly and rearwardly and then downwardly, as at 35, to communicate with the film-forming chamber 36. In this construction the film-forming chamber is relatively small and is provided with but one film-forming duct 37, which is located near the outlet of the discharging-limb 18.

The aperture 38 extends from the inlet-limb 17 to the duct 34, as is clearly shown in Fig. 10, said aperture being located at the normal level of the water in the bowl and the inlet-limb of the siphon. The operation of this last-described closet is precisely similar to the operation of the one previously described, except that the water instead of passing into the retarding-chamber passes upward to the flushing-rim through the duct 32. In both of these embodiments of our invention it will be observed that the inverted-U-shaped pipe is provided with substantially straight unobstructed limbs and that we have omitted the hitherto essential lateral or forwardly projecting portion of the discharging-limb, and consequently we are enabled to prevent the lodgment of foreign or obstructing matter in the siphon. There are no projections upon which such matter could lodge, and consequently the closet is seldom if ever stopped up. By providing for the film of water being formed of the water-supply from the flushing-pipe and not from the bowl said films are formed almost instantly upon opening the valve in the flushing-tank and substantially prior to the flow of water from the bowl over the dam, and we are thereby enabled to secure the siphonic action quicker than has heretofore been possible. By providing for the rapid rarefaction of the air to cause siphonic action we are enabled to secure a withdrawal of the contents of the bowl by siphonic action before the level of the water in the bowl has risen to any marked extent.

The walls of the ducts through which water is supplied from the tank to the film-forming chamber all form a part of the closet and are integral therewith, whereby the closet may be substituted for any ordinary modern siphon-closet without requiring a rearrangement of the soil-pipe or the flushing-tank and its delivery-pipe. However, we do not in all cases form the ducts as an integral part of the bowl structure, and, moreover, frequently form one or both limbs of the siphon of metal and connect the metallic part or parts to the bowl by a proper joint. We have likewise contemplated forming the film or spray forming slots of a series of small holes, since we regard that any means for forming a spray or film of water independent of that of the bowl across the discharging-limb of the siphon, so as to confine the air above it and permit the rarefaction of said confined air by the water flowing over the dam from the bowl, as being included in our invention.

So far as we are aware we are the first to provide a closet in which a film or spray of water is formed across the discharging-limb of the siphon by water supplemental to that contained in the bowl, whereby the deflectors hitherto employed may be dispensed with and a quicker siphonic action may be secured, and consequently, as before stated, we do not limit our invention to the particular closets herein illustrated and described.

Having thus explained the nature of the invention and described a way of constructing and using the same, although without having attempted to set forth all of the forms in which it may be made or all of the modes of its use, we declare that what we claim is—

1. A siphon water-closet having provisions for forming from water, independent of that contained within the bowl, a lower seal consisting of a film or spray across the discharging-limb of the siphon, whereby the outflow of water from the bowl causes a rarefaction of the contained air above the film, with a consequent siphonic action.

2. A siphon water-closet having provisions constituting a permanent part of the bowl structure for forming a film or spray of water across the discharging-limb of the siphon, from a source independent of the water contained in the bowl, whereby said film of water will by forming a lower seal confine the air above it and permit rarefaction of said air by water flowing from the bowl.

3. A siphon water-closet having a U-shaped siphon, whereby the water can flow over the dam into the discharging-limb, said discharging-limb having provisions through which water may be introduced to form a film or spray across said limb below the intake of the siphon to form a lower seal.

4. A siphon water-closet having a bowl, a U-shaped siphon, and a film-forming chamber communicating with the discharging-limb of the siphon through an unobstructed elongated narrow duct or aperture, whereby a film of water may be discharged across the said discharging-limb of the siphon to form a lower seal and permit the rarefaction of air contained thereabove by water flowing from the bowl.

5. A siphon water-closet having a bowl, a U-shaped siphon, the limbs of which are at an inclination to the vertical and to the horizontal, and means for introducing water through the upper wall of the discharging-limb at or below the intake of the receiving-limb in a film or spray to drop or splash against the lower wall of said limb and thereby form a lower seal.

6. A siphon water-closet having a bowl, a siphon having two limbs, a chamber formed by the walls of and located between said limbs and having a duct leading from said chamber to the discharging-limb of the siphon, and means for supplying the said chamber with water, to cause the formation of a water film across said discharging-limb.

7. A siphon water-closet comprising in one earthenware structure a bowl having a flushing-rim, a siphon, an inlet to supply water to the flushing-rim, a film-forming chamber communicating with the discharging-limb of the closet, and a duct leading from the said chamber to the said water-inlet.

8. A siphon water-closet comprising a bowl, a siphon, the discharging-limb of which is formed with a transverse opening, and a duct for supplying water to said opening, said duct having an opening leading into the siphon at the desired water-level to break the siphonic discharge from said duct.

9. A siphon water-closet comprising a bowl, a siphon having a jet-aperture at the mouth of the receiving-limb, and a film-forming opening in the discharging-limb below the intake, and a water duct or conduit communicating with both the jet-aperture and the film-forming aperture.

10. A siphon water-closet comprising a bowl, a siphon consisting of an upwardly-ascending limb which with the bowl constitutes a trap, and a downwardly-descending limb, a jet-aperture located at the intaking end of the ascending limb, a port for forming a film or lower seal across the bore of the descending limb, a supply-conduit for supplying water to the said jet, a conduit leading to the said port, said conduit having a portion substantially in the plane of the level of the water in the bowl, and having an opening for the admission of air to break the siphonic discharge of water from said conduit when the closet is flushed.

In testimony whereof we have affixed our signatures in presence of two witnesses.

GEORGE W. KNAPP.
CHARLES H. ROLLINS.

Witnesses:
M. B. MAY,
H. L. ROBBINS.